April 16, 1929.  M. CAMAGNI  1,709,113
SHUTTLE
Filed April 20, 1928
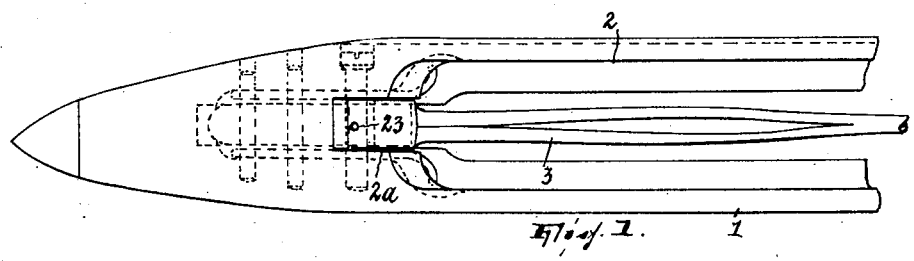
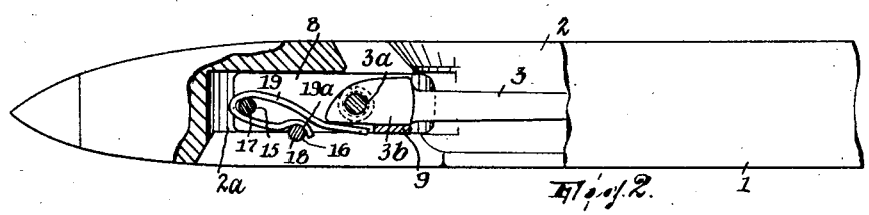
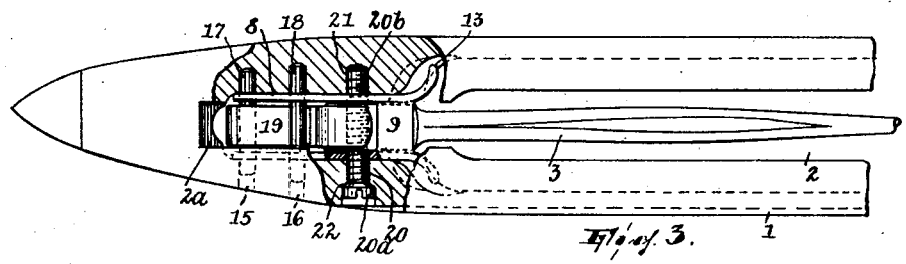
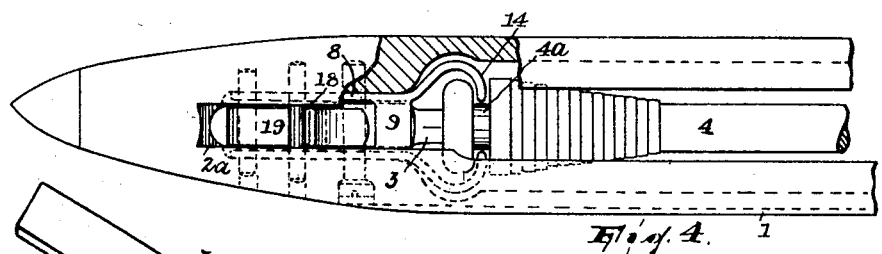
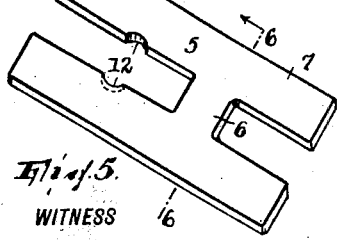
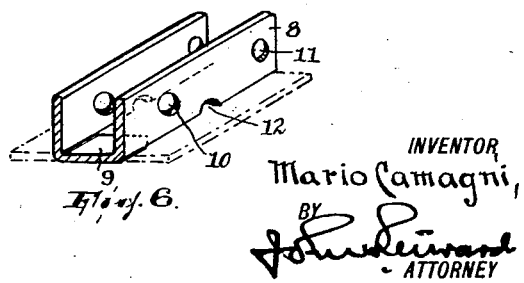
INVENTOR
Mario Camagni,
BY
ATTORNEY Patented Apr. 16, 1929.

1,709,113

UNITED STATES PATENT OFFICE.

MARIO CAMAGNI, OF PATERSON, NEW JERSEY.

SHUTTLE.

Application filed April 20, 1928. Serial No. 271,523.

This invention relates to shuttles having pivoted spindles and particularly to the means for supporting the spindle and the spring usually employed to hold the spindle at either of its limits of motion and especially in its depressed position in the shuttle. According to the invention in its best form the two clips, which usually flank the spindle in shuttles of this class, serving as wear-plates and to reinforce the shuttle body and, where a quill is used on the spindle, to hold the quill against lengthwise movement, are formed integral and with a connecting bridge which limits the pivotal movement of the spindle in the shuttle. The forming of the two clips integral, thus producing a unitary housing, very much strengthens the shuttle and prolongs its life, while the bridge takes the place of the pin ordinarily used to limit the spindle movements, it being known that such pin bends through excessive pressure being applied against the spindle by the operator so that the spindle when the shuttle is in use stands distorted or skewed out of position in the shuttle and that the pin is frequently the cause of splitting of the shuttle body. Other features of the invention are that the pivoting device for the spindle may be removed and when removed permits removal of the spindle without disturbing the housing; that the spindle is adapted to be lubricated in a novel manner; and that the housing and spindle spring are retained in place in a novel manner.

In the drawing,

Fig. 1 is a top plan view of a fragment of the shuttle embodying the invention;

Fig. 2 is a side elevation thereof, partly broken away;

Figs. 3 and 4 are underneath plan views, partly in section, Fig. 3 showing the shuttle as in Fig. 1 and Fig. 4 the shuttle as adapted for containing a quill;

Fig. 5 is a view of the blank from which the housing is formed; and

Fig. 6 the housing in section on a line corresponding to line 6—6 in Fig. 5.

The shuttle body 1 has the usual filling cavity 2 and extending from one end thereof the mortise 2ª which is open downwardly for its full length as shown in Figs. 2, 3 and 4 but is closed at the top from its outer to more or less near its inner end; essentially the mortise consists of two opposite lateral grooves enterable by the housing, which it contains, from the cavity. 3 is the spindle, and this may be adapted to receive a paper tube or cop (not shown) or the quill 4 appearing in Fig. 4.

To form the housing I provide a sheet-metal blank 5 which simulates the letter H excepting that its bridge 6 is offset from central position and bend up the side portions 7 of the blank on lines at the ends of the bridge so that said portions stand in parallel planes. The clips or side walls 8 of the housing thus formed (Fig. 6) are then left integrally joined by a connecting bridge or web 9. Two pairs 10 and 11 of opposite holes are formed in said clips or walls and in what are their underneath edges (the edges joined by the bridge 9) opposite notches 12 are formed; it is not material whether these are formed in the blank before or after its side portions are bent up, but in order to insure the holes in each pair being directly opposite each other usually they will be formed after the bending operation. The shorter end portions of the clips or walls, measuring from the bridge, when the shuttle is to receive a cop, may be flared outwardly as at 13 in Figs. 1 and 3; when the shuttle is to receive a quill, as 4, said ends may be prolonged and bent inwardly to form hooks 14 to engage in the groove 4ª at the butt of the quill to hold the latter against lengthwise displacement.

The housing is slipped from the cavity 2 into the mortise, which it fits snugly. The shuttle body being provided with suitable holes 15 and 16 in registry with the pair of holes 11 and the pair of notches 12 in the housing pins 17 and 18, respectively, are driven into the body 1, pin 17 penetrating the holes 11 and pin 18 engaging the notches 12, thus securing the housing in place.

The pins 17 and 18 afford support for the spindle spring 19 which, in so far as it is a rebent elastic plate having one arm longer than the other, is substantially the same as springs heretofore used in shuttles of this type. But according to this invention the shorter arm is provided with a bend 19ª which forms a recess opening away from the longer arm, or what is the underneath side of the spring when the same is in place. The spring is received between the two sides or clips of the housing and is penetrated by the pin 17 and has its recess 19ª receiving the pin 18. On account of the described engagement of the spring with the pin 18 the spring is held against displacement lengthwise of the shuttle; it will thus appear that pin 18 serves to hold both the housing and the spring against lengthwise displacement in the shuttle.

The pivot for the spindle is afforded by a screw 20 which at one end has a head $20^a$ and whose threading $20^b$ extends from said head to its other end. The shuttle body is bored at 21 and counter-bored, as at 22, to receive the threaded portion and head of the screw. The bore 21 and the holes 10 of the housing being tapped, the screw is screwed into them, the engagement of the (metal) screw with the wood of the body 1 and the metal of the housing preserving the screw from working out.

The spindle butt has a lubricating hole 23 leading to it and radial of bore $3^a$ which itself is smooth or untapped. Oil admitted to this hole will enter said bore and the threading of the screw. A very little oil will serve the purpose of lubricating the spindle for a long time, so that the chance of the oil being thrown onto the goods being woven is practically eliminated.

When the spindle is in place the long arm of the spring engages its pointed butt $3^b$ at the near side of the pivoting screw, thus normally holding the spindle depressed in the usual way except that the butt of the spindle bears downwardly against the bridge 9 which it will be seen is forward of the pivoting axis of the spindle.

Having thus fully described my invention, what I claim is:

1. The combination of a shuttle body having an upwardly open filling-package cavity and a mortise reaching from the cavity toward one end of the shuttle, a spindle in the cavity having its butt in the mortise and being adapted to move up and down on an axis traversing the mortise, a housing secured in the mortise and comprising spaced side walls receiving the spindle butt between them and a bridge integrally connecting said walls, and a removable pivoting device for the spindle entered into the shuttle body through the housing from one side of said body and having its threaded portion screwed into the body and the housing.

2. The combination of a shuttle body having an upwardly open filling-package cavity and a mortise reaching from the cavity toward one end of the shuttle, a spindle in the cavity having its butt in the mortise and being adapted to move up and down on an axis traversing the mortise, a housing secured in the mortise and comprising spaced side walls receiving the spindle butt between them and a bridge integrally connecting said walls, and a removable pivoting device for the spindle entered into the shuttle body through the housing from one side of said body and having its threaded portion screwed into one of them and penetrating the spindle butt, said spindle butt having a lubricating hole leading to the threaded portion of said device.

In testimony whereof I affix my signature.

MARIO CAMAGNI.